UNITED STATES PATENT OFFICE.

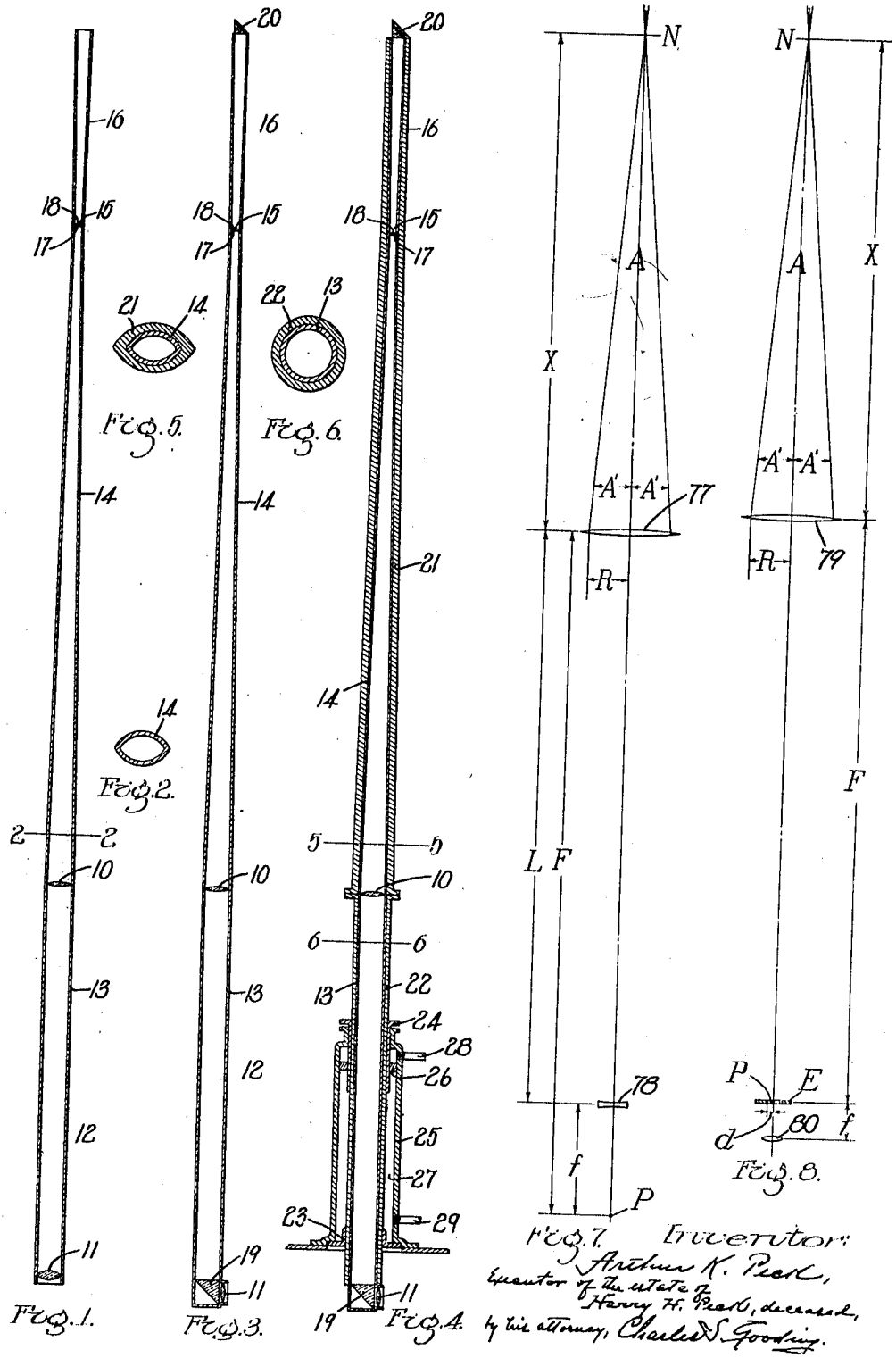

HARRY H. PECK, DECEASED, LATE OF CAMBRIDGE, MASSACHUSETTS, BY ARTHUR K. PECK, EXECUTOR, OF BOSTON, MASSACHUSETTS, ASSIGNOR, BY DIRECT AND MESNE ASSIGNMENTS, OF ONE-HALF TO FORE RIVER SHIPBUILDING CORPORATION, OF QUINCY, MASSACHUSETTS, THREE-EIGHTHS TO ARTHUR K. PECK, OF BOSTON, MASSACHUSETTS, AND ONE-EIGHTH TO NEWELL A. THOMPSON, JR.

OPTICAL INSTRUMENT.

1,314,479.   Specification of Letters Patent.   Patented Aug. 26, 1919.

Original application filed October 23, 1916, Serial No. 127,084. Divided and this application filed November 14, 1918. Serial No. 262,463.

*To all whom it may concern:*

Be it known that HARRY H. PECK, deceased, late a citizen of the United States, residing at Cambridge, in the county of Middlesex, State of Massachusetts, did invent new and useful Improvements in Optical Instruments, (Case C,) of which the following is a specification.

This invention relates to optical instruments, the object of the invention being to provide an optical instrument, the objective end of which is comparatively of very small diameter. This case is divided out of an application for patent on "optical instrument" Serial No. 127,084, and filed in the United States Patent Office on October 23, 1916.

The invention is particularly adapted to be used in connection with periscopes such as are used on submarines, but while the invention hereinafter described is particularly illustrated and described in connection with periscopes, I wish it to be distinctly understood that I do not limit the invention to periscopes, the same being applicable to other forms of optical instruments. In periscopes it is understood that the portion of the periscope which extends above the water should be of as small diameter as possible in order that it may not be visible to the enemy.

The object of the invention is to obtain a clear view of a distant object through a very small and slender tube or housing.

The object of the invention is further to provide a periscope which is small in diameter where it projects above the water and for a considerable distance below the water so that the same may be difficult of observation by the enemy, and also so that it may not make a perceptible wake in the water, for it is by the wake as well as by the part of the periscope extending above the surface of the water that the submarine is discovered by the enemy.

The invention primarily consists in a telescope objective and an eye-piece with a housing therefor extending beyond the telescope objective in the form of a cone to the nodal point of said objective and beyond said nodal point in the form of a reverse cone, said housing forming a means for snugly inclosing the rays of light from the object viewed.

The invention consists in an optical instrument such as hereinafter set forth in the specification and particularly in the combination and arrangement of parts set forth in the claims.

In the following specification and in the claims I use the term "nodal point" to indicate that point where the rays from a distant object to the object glass of a telescope cross each other.

Referring to the drawings:

Figure 1 is a sectional elevation of an optical instrument embodying the invention.

Fig. 2 is an enlarged detail section taken on line 2—2 of Fig. 1.

Fig. 3 is a sectional elevation similar to Fig. 1, but illustrating my invention in the form particularly adapted for periscopes.

Fig. 4 is a sectional elevation of the invention as adapted for a periscope, including means for raising and lowering the housing and its inclosed lens system.

Fig. 5 is a detail section taken on line 5—5 of Fig. 4.

Fig. 6 is a detail section taken on line 6—6 of Fig. 4.

Fig. 7 is a diagrammatic view of the convex objective lens and concave ocular of a Galilean telescope with lines indicating the angular field of view, and the "nodal point."

Fig. 8 is a diagrammatic view of the convex objective lens and convex eye-piece or ocular of an astronomical telescope with lines indicating the angular field of view, and the "nodal point."

Like numerals refer to like parts throughout the several views of the drawings.

In the drawings Figs. 1 and 2 illustrate the invention in its simplest form, the same consisting of a telescope objective, a telescope eye-piece 11 and a housing 12 for said telescope objective and eye-piece.

The housing 12 consists of a cylindrical portion 13 in which are inclosed the telescope objective and eye-piece. Said housing consists, further, of a conical portion 14 extending from the telescope objective to the nodal point 15 and beyond said nodal point in the form of a reverse cone 16. An apertured diaphragm 17 is inserted in the housing in the vicinity of the nodal point.

The "nodal point" is that point at which a ray of light extending directly from the top of the telescope objective to the bottom of the field of view of said objective crosses another ray of light extending from the bottom of said telescope objective to the top of the field of said objective, this point being situated on the principal axis of the telescope objective at a substantial distance from said objective.

The view channel opening 18 in the diaphragm 17 is very small, substantially three-sixteenths of an inch in diameter, and the rays of light coming from the object viewed in a limited field are of very slight angular extension. Said rays are closely housed first by the reversed conical portion 16 of the housing and then by the conical portion 14 which provides a restricted channel for the light rays extending from the crossing point of said rays to the telescope objective 10 and from the crossing point of said rays to the end of the inverted cone or to the upper end of the telescope housing. Thus it will be seen that with the form of the invention illustrated in Figs. 1 and 2 a telescopic view of the object is obtained through a very small top aperture.

In order that the device when used as a periscope should make the least possible wake in passing through the water, I prefer to have the portion of the periscope which projects above and that portion which projects immediately below the surface of the water when the periscope is in use, of an elliptical shape such as that illustrated in Fig. 2. By making the housing of a slender elliptical form in cross section, as particularly illustrated in Fig. 2, the wake is practically eliminated and also the vibration of the tubular housing is very much reduced for the reason that a minimum water resistance is secured near the surface, whereby a very slight wake is produced when the submarine is under way.

When the invention is used as a periscope the inverted conical portion 16 will extend above the surface of the water, that is, the periscope when in use is raised to such a height that the nodal point is substantially even with the surface of the water.

The form of the invention illustrated in Fig. 1 is of the simplest character to which the invention can be reduced, but when the same is used in a periscope it is desirable that the rays from the ocular should enter the eye from a horizontal position while the rays as they pass through the periscope housing must pass in a vertical direction and, therefore, when the invention is embodied in a periscope the same is preferably constructed as illustrated in Fig. 3, in which 10 is the telescope objective, 11 is the telescope eye-piece, 19 is a totally reflecting prism, 13 is the cylindrical portion of the housing and 14 the conical portion of said housing, said conical portion 14 extending from the telescope objective 10 to the nodal point 15 and beyond said nodal point in the form of a reverse cone 16.

At the upper end of the reversed conical portion of the housing is located a totally reflecting prism 20 which diverts the rays of light so that the rays which pass down the reversed conical portion 16 and cross at or near the nodal point 15 thence pass down the conical portion 14 of the housing to the telescope objective 10. From the telescope objective 10 said rays pass to the totally reflecting prism 19 and are reflected by said prism through the telescope eye-piece 11, from whence they converge to the eye of the observer.

The form of the invention embodied in Fig. 4 is substantially the same as that illustrated in Fig. 3, except that it embodies an exterior housing 21 which is elliptical in cross section as illustrated in Fig. 5. The dimensions of the ellipse may be made in any desired proportion so as to render the same more or less fin-like in shape. The lower portion 22 of the exterior housing is made cylindrical to inclose the interior housing 13 as illustrated in Fig. 6 and this cylindrical housing 22 is slidable in bearings 23 and 24 supported upon a stationary base 25. Said cylindrical exterior housing 22 has a piston 26 fast thereto which is movable vertically in a chamber 27 provided in the stationary base 25.

A pipe 28 leads into said chamber above the piston 26, so that by introducing the proper fluid under pressure through the pipe 28 the periscope housing and lenses inclosed therein may be lowered. By introducing said fluid under pressure through the pipe 29 said periscope housing and its lenses may be moved upwardly. The liquid or whatever fluid may be used in the chamber 27 for raising and lowering the periscope housing passes inwardly through the pipe 28 and at the same time passes outwardly through the pipe 29 and vice versa, according to whether the periscope housing is being lowered or raised, respectively.

In using the improved instrument when the same is embodied in the form illustrated in Fig. 4 and when the same is used as a periscope, the observer sees the object from the eye-piece 11 and the image is produced after the rays of light pass through the totally reflecting prism 20, the diaphragm 17, the telescope objective 10 and the totally reflecting prism 19. The housing is raised or lowered, as hereinbefore described, and may be rotated by rotating the cylindrical portion 22 of the exterior housing in its bearings 23 and 24.

It will be seen that by the construction hereinbefore set forth a very slender tube may be used for that portion of the housing shaft which extends above the surface of the water and the object of using such a tube is to render the portion of the periscope top which projects above the water slender and as inconspicuous as possible in order to avoid discovery by the enemy.

It will be readily understood that the nodal point, as hereinbefore defined, is formed by the crossing of the rays extending from the top and bottom of the telescope objective to the bottom and top, respectively, of the field of said objective and may, in practice, extend over several inches longitudinally of the axis of the objective on account of the very slight divergence of the rays from each other, and, therefore, said nodal point for a given diameter objective and given field is not limited to an exact geometrical point, but may be in practice at any point within several inches longitudinally of the axis of said objective.

In order that sufficient data may be set forth to enable one skilled in the art to find the nodal point, for an objective of given diameter and focus, two principal types of telescopes must be considered; first, the Dutch or Galilean telescope and second the astronomical telescope.

*First case, Galilean telescope.*

The lenses of this instrument in its simplest form consist, as illustrated in Fig. 7, of a convex objective lens 77 and a concave ocular 78, the rear focal point of the ocular being at or near the rear focal point of the objective as at P on the principal axis AP of the lenses where P is the rear focal point of both lenses.

The following formula may be used for $$\tan A' = \frac{R}{X} \text{ or } X = \frac{R}{\tan A'}$$

and, therefore, the "nodal point" N lies 69.4 inches from the lens 77.

*Second case, astronomical telescope.*

The simplest astronomical telescope consists of a convex objective lens 79 and a convex eye piece or ocular 80, as illustrated in Fig. 8, the front focal point of the ocular being at or near the rear focal point of the objective as indicated in said figure at P.

In order to obtain a sharply defined border to the field of view it is customary to determining the angular field of view; it is a standard formula:

$$\tan A' = \frac{1}{M} \times \frac{R + rM}{L + DM}$$

in which—

$A'$ = half the angle of the angular field of view.

The following data is needed for the calculation of the angle $A'$.

$R$ = the free radius of the objective.
$F$ = the focal length of the objective.
$f$ = the focal length of the eye lens (the ocular).
$L$ = the optical length of the telescope; this is practically $F - f$.
$M$ = the magnification of the system; this is equal to $\frac{F}{f}$.
$r$ = the radius of the pupil of the eye usually taken as 0.2 centimeters (practically 1/13 inch).
$D$ = the distance between the eye of the observer and the ocular of the telescope; it may be taken as 2 centimeters or say 3/4 of an inch.

Assuming that we have a Galilean telescope, therefore, in which the measurements are as follows:

$r$ = 1/13 of an inch.
$R$ = 0.674 inch.
$F$ = 18 inches.
$f$ = 3 inches.
$M = \frac{F}{f} = 6$.
$L = F - f = 15$ inches.
$D$ = 3/4 inch and substitute these dimensions in the formula hereinbefore set forth, we have $$\tan A' = \frac{1}{6} \times \frac{0.674 + (1/13 \times 6)}{15 + (3/4 \times 6)} = .0097$$

The corresponding angle is 33′ 23″ and the greatest angular field visible in the telescope is twice this or 1° 6′ 46″.

To obtain the "nodal point" N we have the simple trigonometrical relation of $$\frac{0.674}{\tan 33' 23''} = \frac{0.674}{.0097} = 69.4 \text{ in.}$$

place a diaphragm E at the common focal point of the lenses. Then, if the radius of the hole in the diaphragm be denoted by $d$ the half angle of the field of view of the telescope is obtained by the formula $$\tan A' = \frac{d}{fM}$$

Where M is the magnification $= \frac{F}{f}$ or this formula may be simplified considerably as follows: Knowing that the magnification M is the ratio of the focal lengths F and $f$ the formula may be written $$\tan A' = \frac{d}{fM} = \frac{d}{f\frac{F}{f}} = \frac{d}{F}$$

a very simple relation.

As an example of the application of this formula: Assuming F to be 12 inches and the stop radius $d = 0.1244$ (practically 1/8 of an inch), then we obtain $$\tan A' = \frac{0.1244}{12} = 0.01037$$

which is the tangent of an angle of 35′ 39″. The whole angle of view of the telescope is, therefore, 1° 11′ 18″. A calculation for the "nodal point" N then becomes as before for an instrument in which $R = 0.674$ $$\tan A' = \frac{R}{X} \text{ or } X = \frac{R}{\tan A'} = \frac{0.674}{0.01037} = 65 \text{ inches.}$$

Having thus described the invention, what I claim and desire by Letters Patent to secure is:

1. An optical instrument having, in combination, a telescope objective, a telescope eyepiece, a housing therefor, said housing extending beyond said telescope objective in the form of a cone up to the nodal point of said telescope objective and beyond said nodal point in the form of a reverse cone.

2. An optical instrument having, in combination, a telescope objective, a telescope eyepiece, a housing therefor said housing extending beyond said telescope objective in the form of a cone up to the nodal point of said telescope objective and beyond said nodal point in the form of a reverse cone and having an opening for the passage of rays of light in its objective end of substantially smaller diameter than the diameter of said telescope objective.

3. An optical instrument having, in combination, a telescope objective, a telescope eyepiece, a housing therefor, said housing extending beyond said telescope objective in the form of a cone up to the nodal point of said telescope objective and beyond said nodal point in the form of a reverse cone and terminating at a substantial distance beyond the nodal point of said telescope objective.

4. An optical instrument having, in combination, a telescope objective, a telescope eyepiece, a housing therefor, said housing extending beyond said telescope objective in the form of a cone up to the nodal point of said telescope objective and beyond said nodal point in the form of a reverse cone, whereby the slightly diverging rays of light of but slight angular extension from beyond said nodal point to said nodal point and from said nodal point to said telescope objective may be snugly inclosed.

5. An optical instrument having, in combination, a telescope objective, a telescope eyepiece, a housing therefor, said housing extending beyond said nodal point of said telescope objective and having its inner walls converging from said telescope objective toward said nodal point and diverging beyond said nodal point.

6. An optical instrument having, in combination, a telescope objective, a telescope eyepiece, a housing therefor, said housing extending beyond said telescope objective in the form of a long, slender, keen-edged elliptical cone up to the nodal point of said telescope objective and beyond said nodal point in the form of a reverse cone.

7. An optical instrument having, in combination, a telescope objective, a telescope eyepiece, a housing therefor, said housing extending beyond said telescope objective in the form of a long, slender, keen-edged elliptical shaped cone up to the nodal point of said telescope objective and extending beyond said nodal point in the form of a reverse cone, whereby slightly diverging rays of light of but slight angular extension from the objective end of said telescope objective to said nodal point and from said nodal point to said telescope objective may be snugly inclosed and but little of sensible intensity of the light rays lost therein.

8. An optical instrument having, in combination, a telescope objective, a telescope eyepiece, a housing therefor, said housing extending beyond said telescope objective in the form of a cone up to the nodal point of said telescope objective and beyond said nodal point in the form of a reverse cone and a small apertured diaphragm centered about the principal axis of said telescope objective and located in said housing adjacent to said nodal point.

9. An optical instrument having, in combination, a telescope objective, a telescope eye-piece, a housing therefor, said housing extending beyond said telescope objective to the nodal point of said telescope objective in the form of a cone and beyond said nodal point in the form of a reverse cone and having an opening for the passage of rays of light in its objective end of substantially smaller diameter than the diameter of said telescope objective and means to raise and lower said housing.

10. An optical instrument having, in combination, a telescope objective, a telescope eye-piece, a housing therefor, said housing extending beyond said telescope objective to the nodal point of said telescope objective in the form of a cone and beyond said nodal point in the form of a reverse cone and having an opening for the passage of rays of light in its objective end of substantially smaller diameter than the diameter of said telescope objective, a support upon which said housing is rotatably mounted and means to raise and lower said housing.

11. An optical instrument having, in combination, a telescope objective, a telescope eye-piece, a housing therefor, said housing extending beyond said telescope objective to the nodal point of said telescope objective in the form of a cone and beyond said telescope objective in the form of a reverse cone and having an opening for the passage of rays of light in its objective end of substantially smaller diameter than the diameter of said telescope objective and a totally reflecting prism located adjacent to said eye-piece and between said eye-piece and telescope objective.

12. An optical instrument having, in combination, a telescope objective, a telescope eye-piece, a housing therefor, said housing extending beyond said telescope objective in the form of a cone up to the nodal point of said telescope objective and beyond said nodal point in the form of a reverse cone and a totally reflecting prism located in said housing intermediate said eye-piece and objective and adjacent to said eye-piece.

13. An optical instrument having, in combination, a telescope objective, a telescope eye-piece, a housing therefor, said housing extending beyond said telescope objective up to the nodal point of said telescope objective in the form of a cone and beyond said nodal point in the form of a reverse cone and having an opening for the passage of rays of light in its open end of substantially smaller diameter than the diameter of said telescope objective, a totally reflecting prism located at one end of said housing adjacent to said eye-piece and intermediate said eye-piece and objective and another totally reflecting prism located in the opposite end of said housing.

14. An optical instrument having, in combination, a telescope objective, a telescope eye-piece, a housing therefor, said housing extending beyond said telescope objective in the form of a cone to the nodal point of said telescope objective and beyond said telescope objective in the form of a reverse cone, a totally reflecting prism located at one end of said housing adjacent said eye-piece and intermediate said eye-piece and objective and another totally reflecting prism located at the opposite end of said housing.

In testimony whereof I, ARTHUR K. PECK, executor of the estate of Harry H. Peck, deceased, have hereunto set my hand in presence of two subscribing witnesses.

ARTHUR K. PECK,
*Executor of the estate of Harry H. Peck, deceased.*

Witnesses:
DANIEL A. ROLLINS,
CHARLES S. GOODING.

Copies of this patent may be obtained for five cents each, by addressing the "Commissioner of Patents, Washington, D. C."